May 30, 1961      J. M. CLUWEN      2,986,656

DEVICE FOR READING OUT THE STATE OF A TRIGGER

Filed May 8, 1958

INVENTOR
JOHANNES MEYER CLUWEN

BY
AGENT

United States Patent Office 2,986,656
Patented May 30, 1961

2,986,656
DEVICE FOR READING OUT THE STATE
OF A TRIGGER

Johannes Meyer Cluwen, Eindhoven, Netherlands, assignor to North American Philips Company, Inc., New York, N.Y., a corporation of Delaware Filed May 8, 1958, Ser. No. 733,870

Claims priority, application Belgium May 10, 1957

5 Claims. (Cl. 307—88.5)

"Electronics" of March 1955, pages 198 to 202, describes a trigger comprising a semi-conductive body with two base-contacts conductive in both directions and between which provision is made of an asymmetrically conductive emitter-contact. The several contacts of this body are biased so as to produce a drift field between the base-contacts, while the circuit of the emitter-contact has an input-characteristic with a negative resistance part and two stable states in which this emitter-contact is poorly conductive and highly conductive respectively.

In said article it is pointed out that, for example in a counter, one semi-conductive member comprising two base-contacts and a plurality of emitter-contacts might be substituted for a plurality of semi-conductive members of the type referred to.

For many uses of a trigger having two or more stable states, it is important to be able to read out the state of the trigger and to cause it to resume its initial or rest state.

The present invention concerns a device for reading out the state of a trigger of the aforesaid type comprising one or more emitter-contacts and having two or more stable states. This device has the feature that, opposite the emitter-contact, provision is made of an asymmetrically conductive collector-contact to which is supplied a read out pulse of reverse voltage which draws off the free charge carriers injected by the emitter during the highly conductive condition, thereby causing moreover the change-over of the trigger to its poorly conductive condition.

In order that the invention may be readily carried into effect, examples will now be described in detail with reference to the accompanying drawing, in which Fig. 1 is a circuit diagram of a trigger of the type set out in the article of "Electronics" referred to.

Figure 1:
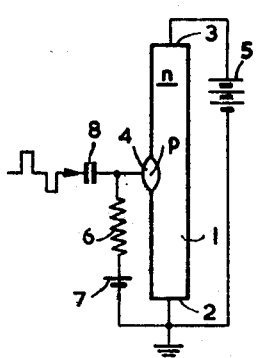

The trigger shown in Fig. 1, comprises a semi-conductive member 1, for example a rod of germanium of n-conductivity type. Base-contacts 2 and 3 conductive in both directions are provided at the ends of this rod. For example, a metallic film is vaporized on these ends and a connecting wire is soldered to this film. Approximately midway between the two base-electrodes 2 and 3 an asymmetrically conductive emitter-contact 4 is formed on the rod 1. For example, a droplet of an "acceptor" material, for example indium, is deposited on the rod and subsequently heated so that the indium diffuses into the germanium of the rod and creates therein a zone of p-conductivity type. Hence, a barrier layer is produced between the n-type germanium and the indium-containing p-type germanium in the proximity of the emitter-contact.

The two base-contacts 2 and 3 are connected to the terminals of a base-voltage source 5 producing an electric field between the contacts 2, 3 and determining the potential of the semi-conductive material in the proximity of the emitter-contact 4. This contact is in turn connected through a resistor 6 to the positive terminal of a source 7 of bias voltage, the negative terminal of which is connected to the negative terminal of the source 5 and to the first base-contact 2. The voltage of the source 7 is about one-half of that of the source 5 and so chosen that a feeble reverse voltage is operative over the barrier layer of the emitter-contact 4. Under these conditions, the emitter-contact remains non-conductive and the potential distribution along the rod 1 is substantially linear.

If a positive pulse is supplied, through a coupling capacitor 8, to the emitter-contact 4, the blocking potential at its barrier is overcome by the temporary forward voltage, which results in injecting holes into the rod, which holes are carried along by the electric "drift"-field between the base-contacts to the most negative base-contact 2, thereby producing a current of holes from the emitter-contact 4 to the base-contact 2. This current disturbs the potential distribution along the rod 1, the electric field in the part of the rod between the base-contact 2 and the emitter-contact 4 becoming weaker and the forward voltage across the barrier layer becoming stronger. The current between the contacts 2 and 4 increases until the emitter-contact 4 has approximately the same potential as the base-contact 2 and, after the input pulse, the emitter-contact remains biased in forward direction and conductive. It can again be made non-conductive by a negative pulse biasing the emitter-contact again in the reverse direction.

Figure 2:
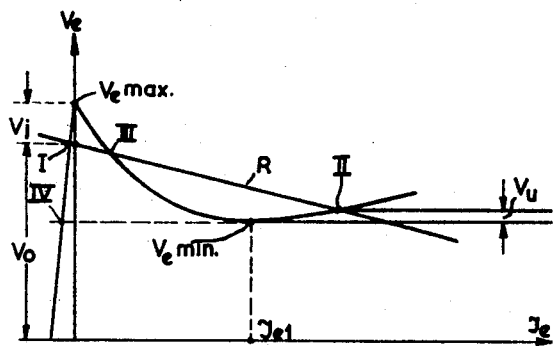
Fig. 2 is a diagram for explaining the operation of this trigger.

Fig. 2 shows the voltage-current characteristic of a double base diode of the type shown in Fig. 1. The straight line R intersects the voltage axis at a level $V_o$ corresponding to the voltage of the source 7. Its slope corresponds to a value of, say, 100 kilo-ohms of the resistor 6. The input characteristic of the emitter-contact comprises a substantially straight part, on the left of the voltage axis, which corresponds to a reverse leakage-current, a part of negative resistance character located between the abscissae $I_e = 0$ and $I_{e1}$, on which the voltage $V_e$ attains a maximum value and a minimum value respectively, and a part of resistance character on the right of $I_{e1}$. When choosing the values of the bias $V_o$ and of the load resistor 6 so that the load line R intersects the characteristic of the emitter-contact at three points, one in each of the three regions of the emitter-characteristic, the circuit arrangement shown in Fig. 1 is bistable and constitutes a trigger. In the first stable condition I, only a weak reverse current passes through the emitter-contact 4. A positive voltage pulse having an amplitude in excess of or equal to $V_i$ brings the emitter-contact above a threshold voltage $V_o + V_i$, the operating point then falling along the part of the characteristic of negative resistance character and reaching the second stable condition II via the unstable intersection III and the minimum ($I_{e1}$, $V_e$ min.). A negative voltage pulse having an amplitude in excess of or equal to $V_u$ shifts the operating point back to the minimum ($I_{e1}$, $V_e$ min.) and moves it back to the point IV on the left-hand branch of the emitter-characteristic, whence it returns to the stable condition I.

Figure 3:
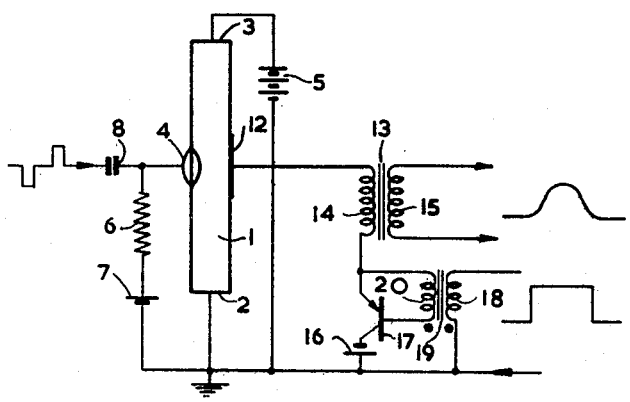
Figures 3 and 4 are circuit diagrams of two forms of the device according to the invention.

In Fig. 3, an asymmetrically conductive collector-contact 12 is provided opposite the emitter-contact of the trigger shown in Fig. 1. In accordance with the invention, a reverse read out pulse is supplied to this collector-contact, via an output impedance constituted by the primary winding 14 of an output transformer 13 and the emitter-collector-path of a junction transistor 17 of p-n-p-type functioning as a switch. The collector of the transistor 17 is connected to the negative terminal of a supply 16, the positive terminal of which is connected to the base-contact 2 and to earth. The emitter-base circuit of the transistor 17 comprises the secondary winding 20 of a transformer 19, on the primary winding 18 of which control pulses are impressed.

By means of a control pulse applied to the winding 18 the emitter-collector path of the transistor 17 is temporarily rendered conductive.

If the emitter-contact 4 is non-conductive, the circuit of the collector-contact 12 remains non-conductive and substantially no current passes through the primary winding 14 of the output transformer 13.

If the emitter-contact 4 is conductive, the free charge carriers (holes) injected by this contact are drawn off to the collector-contact as a result of the electric field generated between the collector-contact 12 and the emitter-contact 4 during the read-out pulse impressed on the primary winding 18. As a result, a current is produced through the primary winding 14 of the output transformer 13 and a commensurate output pulse is transmitted to the output terminals connected to the secondary winding 15 of this transformer. As soon as the amount of free charge carriers stored between the emitter- and base-contacts 4 and 2 is exhausted due to the reverse voltage at the collector-contact 12, the base material in the proximity of the emitter-contact 4 reassumes a potential relative to the emitter-contact 4 and the trigger resumes its initial non-conductive condition.

Hence, in the example illustrated in Fig. 3, the condition of a trigger as shown in Fig. 1 can be read out by means of a read-out pulse which, moreover, resets the trigger to its non-conductive condition.

Figure 4:
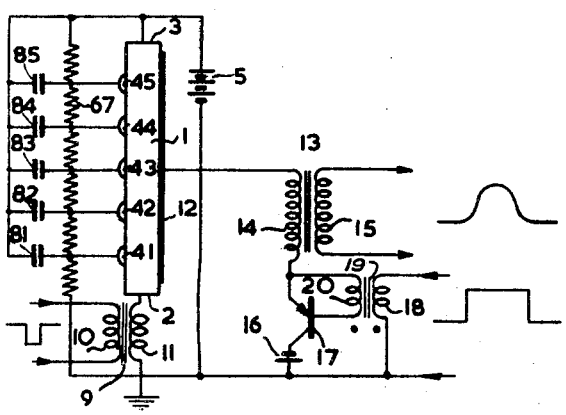

The example shown in Fig. 4 comprises a trigger having more than two stable states. This trigger again comprises a semi-conductive member 1 with two base-contacts 2 and 3 conductive in both directions. Between these base-contacts provision is made of a plurality of asymmetrically conductive emitter-contacts 41 to 45. These contacts are connected to corresponding tappings of a voltage divider 67 which is connected, in series with the secondary winding 11 of a read-in transformer 9, between the base-contacts 2 and 3. A capacity represented by capacitors 81 to 85 is active between each of the emitter-contacts and a point of constant potential. These capacities may, if desired, be constituted by the natural capacity of each of the emitter-contacts 41 to 45 together with their wiring. A common collector-contact 12 exends opposite all of the emitter-contacts. The circuit of this collector-contact is identical to that of the collector-contact 12 shown in Fig. 3. The primary winding 14 of the output transformer 13 constitutes a common output impedance for the emitter-contacts 41 to 45 functioning as a trigger.

Negative read-in pulses are applied through a primary winding 10 of the read-in transformer 9 and through this transformer between the base-contact 2 on the one hand and earth, the emitter-contacts 41 to 45 and the second base-contact 3 on the other hand.

In the rest or non-conductive condition of the trigger, the barrier of each of the emitter-contacts is biased in the reverse direction by the drift field produced by means of the supply 5 between the base-contacts 2 and 3. The emitter-contact 41 is rendered conductive by a first short-read-in pulse, in exactly the same manner as the emitter-contact 4 shown in Figure 1 or 3. Owing to the successive resistance-capacity networks connected between earth and the several emitter-contacts and constituted by capacitors 81 to 85 and the base-zone of the member 1, the first read-in pulse is first operative between the base-contact 2 and the emitter-contact 41, so that this emitter-contact becomes conductive prior to all the others. As a result, the field distribution between the base-contacts 2 and 3 changes after the read-in pulse: the resistance of the base-zone of the semi-conductive member 1 between the emitter-contact 41 and the base-contact 2 drops drastically and the potential of this emitter-contact 41 decreases to a value slightly exceeding earth potential.

The emitter-contacts 42 to 45 are similarly rendered conductive by succeeding read-in pulses, until all of them are conductive or no further read-in pulses are supplied to the winding 10.

The holes injected into the semi-conductive member 1 by each of the conductive emitter-contacts 41 to 45 are carried along to the base contact 2 by the drift-field between the base-contacts 2 and 3. They have, however, to travel a comparatively long path in this comparatively poorly conductive member 1 so that holes in excess are stored in the proximity of each conductive emitter-contact. If a negative read-out pulse is applied via the emitter-collector path of the transistor 17 to the collector-contact 12 all of the stored holes are drawn off to the collector-contact 12 by a comparatively strong transversal field. As a result of these holes being drawn off, the initial drift-field beween the base-contacts 2 and 3 is simultaneously re-established so that the emitter-barrier layers are again biased in the reverse direction. Hence, on termination of the read-out pulse the arrangement is again in its initial condition in which all of the emitter-contacts are non-conductive.

The current pulse produced through the winding 14 by the holes stored or not in the proximity of the several conductive emitter-contacts is in direct relationship with the number of conductive emitter-contacts. Consequently, the arrangement shown in Fig. 4 is capable of accepting and storing an information corresponding to any one of six possible conditions and of restituting this information in the form of one pulse having a given energy content, the arrangement being simultaneously reset to its initial or zero condition.

Of course, a greater number of emitter-contacts may be provided on one or on several series-connected semi-conductive members and in this manner, a very simple counter, for example a decimal or a duo-decimal counter, can be built.

A semi-conductive member, for example as shown in Fig. 4, may be obtained with the help of the known diffusion-base process described, for example, in the Bell System Technical Journal of January 1956, pages 23 ff.: A semi-conductive single crystal, for example of germanium or silicon of one conductivity type, for example p-conductivity type, is exposed to the vapour of a material producing a surface layer of the other (n)-conductivity type. This layer is reduced by etching to the required surface area and provided at its ends with contacts conductive in both directions. These contacts constitute the base-contacts 2 and 3 between which asymmetrically conductive emitter-contacts are provided, preferably with the aid of an alloying process.

What is claimed is:

1. A device for reading-out the state of a trigger comprising a semi-conductive member having two base-contacts conductive in both directions and at least one asymmetrically conductive emitter-contact between said two base-contacts, bias means connected to said base and emitter contacts with a polarity to produce a drift field between the base-contacts, said bias connection producing an emitter-input characteristic having a negative resistance region and two stable conditions in which the emitter-contact is substantially non-conductive and highly conductive respectively, the barrier layer of each emitter-contact being polarized in the reverse direction by the drift field in its non-conductive state, means for applying an input pulse rendering said emitter-contact highly conductive, an asymmetrically conductive collector-contact located on said member opposite the emitter-contact, and means for applying a counter read-out and reset pulse of reverse voltage to said collector-contact, said read-out pulse drawing off the free charge carriers injected by the emitter during the highly conductive condition and changing over the trigger to its substantially non-conductive condition.

2. A device for reading-out the state of a trigger comprising: a semi-conductive member having two base-contacts conductive in both directions and a plurality of asymmetrically conductive emitter-contacts between said two base-contacts, bias means connected to said base and emitter contacts with a polarity to produce a drift field between the base-contacts, said bias connection producing an emitter-input characteristic having a negative resistance region and two stable conditions in which the emitter-contact is substantially non-conductive and highly conductive respectively, the barrier layer of each emitter-contact being polarized in the reverse direction by the drift field in its non-conductive state, means for applying input pulses between each of the emitter-contacts and one of the base contacts, the emitter contacts being successively rendered conductive in accordance with the number of input pulses, each input pulse rendering the corresponding emitter-contact highly conductive, an asymmetrically conductive collector-contact located on said member opposite the emitter-contacts, and means for applying a counter read-out pulse of reverse voltage to said collector-contact through a common output impedance, said read-out pulse draining off the free charge carriers injected by the emitter during the highly conductive condition and changing over the trigger to its substantially non-conductive condition, the application of the read-out pulse producing an output pulse in said output impedance having an amplitude proportional to the number of conductive emitter-contacts.

3. A device as claimed in claim 2, wherein said collector-contact extends opposite all of the emitter-contacts.

4. A device as claimed in claim 2, wherein a voltage divider is connected between the emitter-contacts and the base-contacts, the input pulses being applied across one base-contact and said voltage divider.

5. A device as claimed in claim 3, wherein a voltage divider is connected between the emitter-contacts and the base-contacts, the input pulses being applied across one base-contact and said voltage divider.

References Cited in the file of this patent

UNITED STATES PATENTS

| | | |
|---|---|---|
| 2,761,020 | Shockley | Aug. 28, 1956 |
| 2,801,348 | Pankove | July 30, 1957 |
| 2,866,105 | Eckert | Dec. 23, 1958 |
| 2,901,640 | Steinman | Aug. 25, 1959 |
| 2,922,898 | Henisch | Jan. 26, 1960 |